United States Patent [19]

Mehaffey et al.

[11] 4,392,129
[45] Jul. 5, 1983

[54] MULTIPLEXED LIQUID CRYSTAL DISPLAY

[75] Inventors: Joseph H. Mehaffey, Atlanta; Aleksander Szlam, Marietta, both of Ga.

[73] Assignee: Solid State Systems, Inc., Atlanta, Ga.

[21] Appl. No.: 248,230

[22] Filed: Mar. 27, 1981

Related U.S. Application Data

[62] Division of Ser. No. 54,146, Jul. 2, 1979, Pat. No. 4,286,118.

[51] Int. Cl.³ .............................................. G09G 3/18
[52] U.S. Cl. .................................... 340/765; 340/784; 340/798; 340/802
[58] Field of Search ............... 340/765, 802; 350/332, 350/333

[56] References Cited

U.S. PATENT DOCUMENTS

| | | | |
|---|---|---|---|
| 3,532,813 | 10/1970 | Lechner | 350/332 X |
| 3,654,606 | 4/1972 | Marlowe et al. | 350/332 X |
| 3,787,834 | 1/1974 | Elliott . | |
| 3,824,003 | 7/1974 | Koda et al. | 350/333 |
| 3,862,360 | 1/1975 | Dill et al. | 350/332 X |
| 4,091,377 | 5/1978 | Shimoi | 340/765 |
| 4,109,242 | 8/1978 | Channin | 350/356 |
| 4,205,516 | 6/1980 | Terao | 340/756 X |
| 4,236,153 | 11/1980 | Aling | 340/802 X |
| 4,236,155 | 11/1980 | Nagata | 340/784 |

Primary Examiner—David L. Trafton
Attorney, Agent, or Firm—Jones & Askew

[57] ABSTRACT

A multiplexed liquid crystal display arrangement including a back plane (241) driven by a signal (212) derived from a common clock signal (200). The clock signal on the back plane is also provided to one input of an EXCLUSIVE OR gate (245b) the other input of which is the incoming multiplexed data. A second clock signal (211) drives the multiplexing counter (141) which in turn drives the address lines (221) of an analog multiplexer (138). Each segment of a multi-segment liquid crystal display having the common back plane (241) has attached thereto a capacitor (C1 through C64) acting as a temporary storage for the signals. A spike suppression flip-flop (247) is used to disable the multiplexer during changes on the address lines in order to suppress output spikes which occur during such changes. The period of the spike suppression pulse is selected to be short with respect to the on period of each segment in the multiplex timing.

2 Claims, 3 Drawing Figures

MULTIPLEXED LIQUID CRYSTAL DISPLAY

CROSS REFERENCE TO RELATED APPLICATION

This application is a division of application Ser. No. 54,146 filed July 2, 1979, now U.S. Pat. No. 4,286,118 entitled "Data Distribution System For Private Automatic Branch Exchange."

TECHNICAL FIELD

The present invention relates to electronic display devices and more particularly to a multiplexed, multi-segment, display devices using liquid crystal segment elements.

BACKGROUND OF THE INVENTION

Various arrangements for providing multiplexed electronic displays, using liquid crystal and other display devices have been known. One of the known requirements for successfully operating a liquid crystal display is that no net DC offset voltage be applied between the back plane of a display element and each segment plane. Such a DC voltage is present for any significant period of time the liquid crystal will tend to solidify.

It has heretofore been unknown in the art to be able to use available off the shelf analog multiplexers in constructing a multiplexed liquid crystal display because of the spikes which appear at the output of such devices during transitions on the address lines.

SUMMARY OF THE PRESENT INVENTION

The present invention provides a novel, inexpensive, and easy to construct multiplexed liquid crystal display arranged by applying a clock signal derived from a clock signal controlling and multiplexed input data to the back plane for multi-segment liquid crystal display and to a switching apparatus preferably embodied by EXCLUSIVE OR gating circuitry which carries the data input to a multiplexer. The switching circuitry is arranged to provide an asserted form of the input data when the clock, and thus the back plane, is in one state and to provide a complement of the data when the clock is in its alternate state.

The preferred form also includes an arrangement driven by a commonly derived clock signal for disabling the output of the multiplexer during transitions on the address lines.

DETAILED DESCRIPTION

The present invention was originally disclosed in U.S. patent application Ser. No. 54,146 filed July 2, 1979, now U.S. Pat. No. 4,286,118, of which the present application is a division. Said application Ser. No. 54,146 disclosed a data distribution system for use in a private automatic branch exchange which is the environment in which the present invention was originally developed. Said U.S. Pat. No. 4,286,118 is hereby incorporated by reference exactly as set forth herein.

Figure 1:
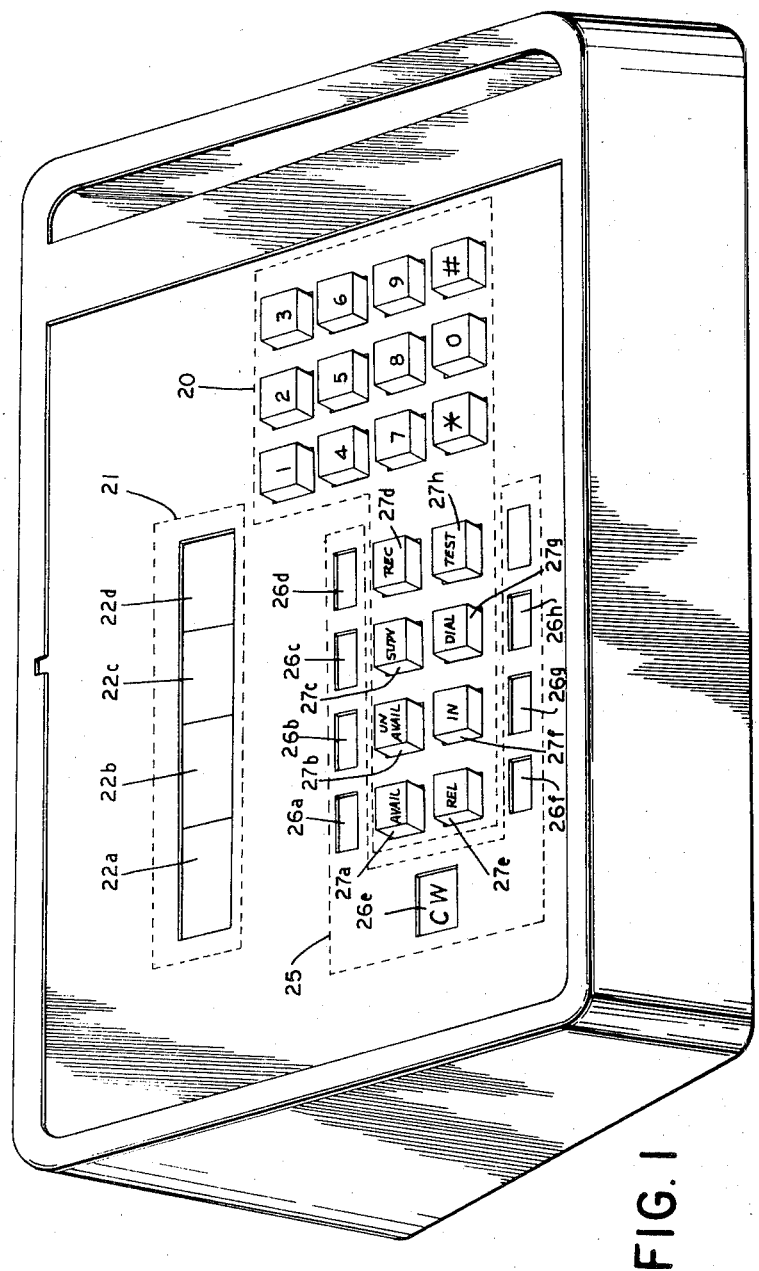
FIG. 1 shows a PABX station using the present invention.
Figure 2A:
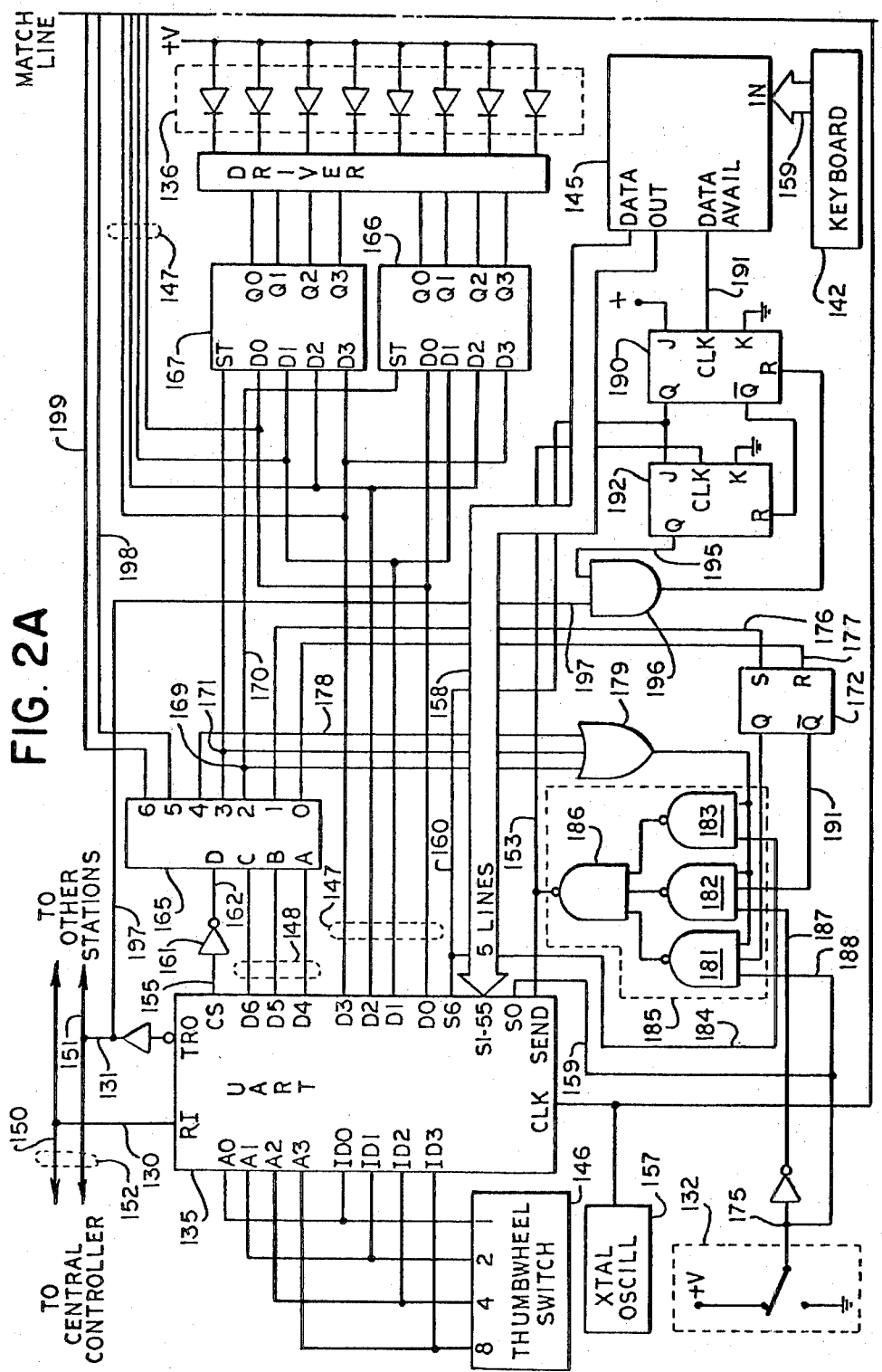
FIGS. 2A and 2B show an environment of the present invention with the preferred embodiment of the present invention being shown in FIG. 2B.
Figure 2B:
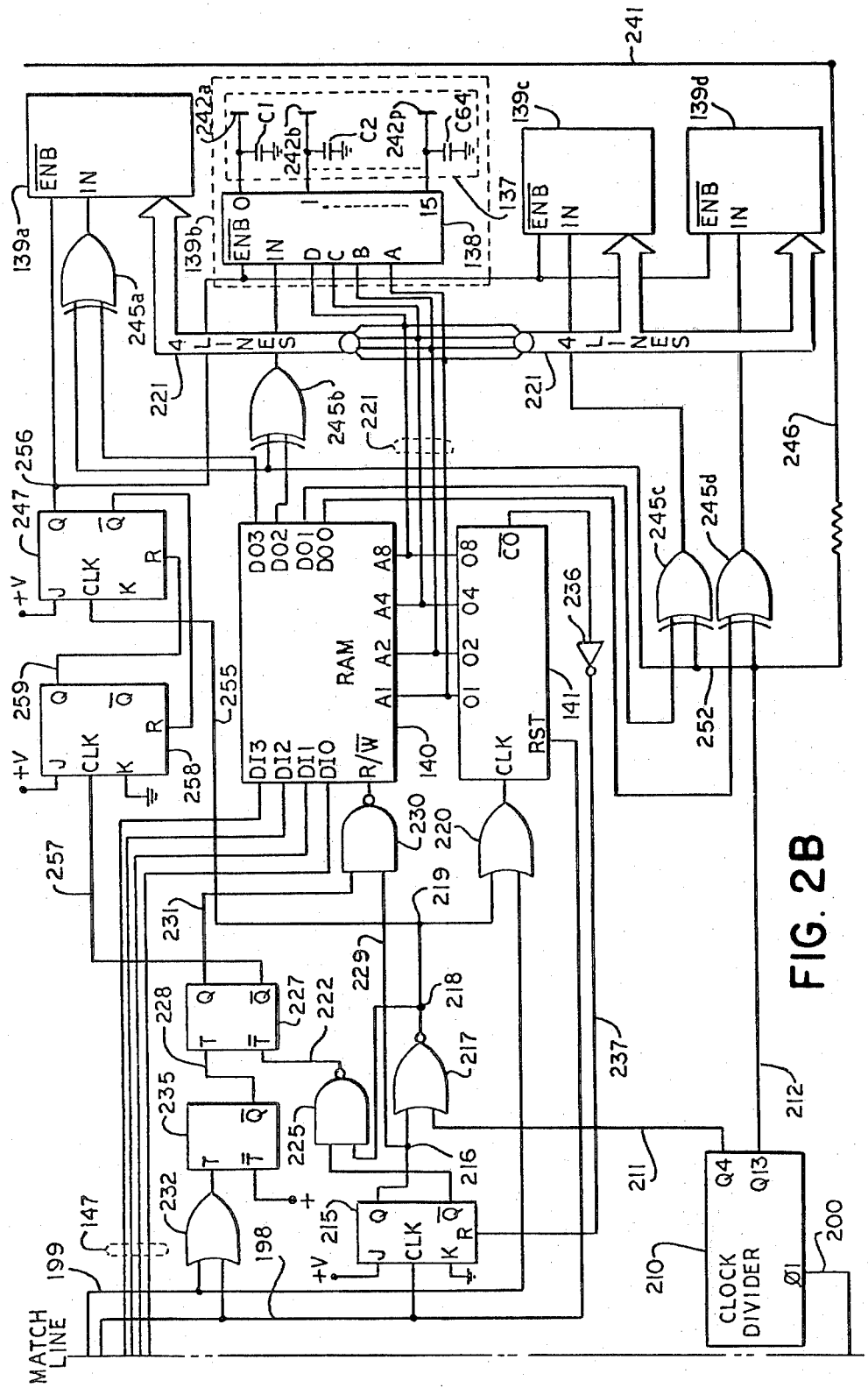

FIGS. 2A and 2B show the data circuitry associated with the PABX station shown in FIG. 1. In the environment of the present invention as disclosed in said application Ser. No. 54,146, it is to be understood that data derived from a central controller is provided to the station along a two wire data link 152 shown in FIG. 2A.

In the disclosure of said U.S. Pat. No. 4,286,118 it is indicated how data is written into random access memory 140 shown in FIG. 2B herein.

The preferred embodiment of the present invention is shown in FIG. 2B and will be understood to be arranged to display the contents of RAM 140 when NAND gate 230 provides a logical 1 output conditioning RAM 140 to output data at its DO zero to DO three output.

It is to be understood that each of blocks 139a through 139d correspond to one of sections 22a through 22d shown in FIG. 1 which are substituents of a four section liquid crystal display 21.

Each of blocks 139a–139d are identical and the details are shown in block 139b. Each of blocks 139a–139d correspond to one sixteen segment liquid crystal display and an analog multiplexer shown as 240 in display block 139a. In the preferred embodiment, multiplexer 240 is a type CD4097B CMOS analog multiplexer currently manufactured by RCA.

All four sections 139a–139d of the liquid crystal display have a common back plane 241. The individual segments of LCD section 137 are shown as 242a–242p.

As may be seen from FIG. 3B, the address inputs (A–D) of each of the analog multiplexers of LCD blocks 139a–139d are all tied to the common address bus 221 driven by counter 141. The input to each of LCD blocks 139a–139d comes from an EXCLUSIVE OR gate 245a–245d.

Since the address inputs of all the analog multiplexers are tied to a common bus, for any given state of counter 141 the input of each multiplexer will be provided to the same segment of each section of the LCD display in blocks 139a–139d.

EXCLUSIVE OR gates 245a–245d have, as a common input, the 75 Hz signal which appears on line 212. The other input for each of EXCLUSIVE OR gates 245a–245d are provided from the data outputs, DO3–DO0, respectively. Note also that the 75 Hz signal on line 212 is provided through line 246 to back plane 241.

As is known to those skilled in the art, it is necessary to prevent a constant DC offset from appearing between the back plane of a liquid crystal display and any particular segment, since a rather small net DC voltage therebetween sustained over a long period of time will destroy the liquid crystal device. By providing a common input between back plane 241 and each of EXCLUSIVE OR gates 245a–245d and by providing the data to be displayed in each segment as the other input to the EXCLUSIVE OR gates, the present invention provides a novel way of multiplexing a liquid crystal display without the danger of the segments solidifying and without the use of flip-flop data latches.

Assume that address bus 221 is providing all zeros. Therefore multiplexer 240 will route the output of EXCLUSIVE OR gate 245b to segment 242a of LCD section 137. If the DO2 output of RAM 140 is a logical zero, EXCLUSIVE OR gate 245b will pass the logic state present on line 252 through to its output. Since line 252 will be in the same logical condition as back plane 241, no potential difference will appear between segment 242a and back plane 241.

If the DO2 output of RAM 140 is a logical one, EXCLUSIVE OR gate 245b will invert the logic state on line 252. Therefore, a logical one data input to EXCLUSIVE OR gate 245b from the DO2 output of RAM 140 will assure that the logic state on segment 242a is the opposite of the logic state of back plane 241 thus activating that particular segment of the LCD.

Therefore it may be seen that EXCLUSIVE OR gates 245a-245d comprise a switching means for providing the input of multiplexers 139a-139d with non-inverted data when the clock signal on back plane 241 is zero and inverted data when the clock signal is a one.

Since address counter 141 is driven by a 38.4 kHz clock signal on line 211 when it is in its scan mode, each segment of the four LCD sections is updated approximately every 390 microseconds. The signal on back plane 241 and line 252 from line 212 is 75 Hz and therefore changes state approximately once every 13 milliseconds. The capacitors attached to each of segments 242a-242p, together with the output resistance from multiplexer 240, provide a sufficient time constant to maintain the appropriate voltage for each segment while the remaining segments are being updated.

Another novel feature of the multiplexed LCD display of the present invention is the apparatus shown in FIG. 3B for removing spikes from the outputs of analog multiplexer 240 when the address inputs of the multiplexer are changing. This allows use of a CMOS analog multiplexer and a multiplexed display without the output spikes which normally accompany address changes on an analog multiplexer. This is provided by spike blanking flip-flop 247 and the circuitry associated therewith. In the scanning mode, read/write flip-flop 215 is cleared providing a logical one as one input to NAND gate 225. This logical one conditions NAND gate 225 to invert the clock signal at point 218 and provide this inverted signal along line 222 to the negative edge trigger of one shot 227. Therefore, one shot 227 will trigger upon the rising edge of the clock signal at point 218, which is also the clock signal that clocks counter 141. The clock signal at point 218 is also present at point 219 and provided along line 255 to the clock input of spike blanking flip-flop 247. Therefore, upon a rising edge at point 219, flip-flop 247 is set since it has a permanent J=1, K=0 input state.

The setting of flip-flop 247 provides a logical one to point 256. Point 256 is connected to the negated ENABLE (ENB) inputs to each of the analog multiplexers and LCD blocks 139a-139d. As will be appreciated by those skilled in the art, a logical one on a negated ENABLE input for an analog multiplexer maintains all of the outputs of the multiplexer in their logical zero state. It has been found that disabling the outputs of an analog multiplexer will prevent the normal spikes associated with changes on the address inputs.

Since one shot 227 fired (after the propagation delay through gate 225) on the same edge which sets flip-flop 247, flip-flop 247 will not clear until one shot 227 times out. The period of one shot 227 is on the order of a few microseconds and when this one shot times out, a rising edge appears on line 257 which clocks flip-flop 258. The clocking of flip-flop 258 provides a logical one on line 259, which is connected to the direct reset input of flip-flop 247. The resetting of flip-flop 247 applies a logical zero to point 256, which enables the analog multiplexers of LCD sections 139a-139d to route the signal at their inputs to the appropriate output selected by the address on address bus 221. The resetting of flip-flop 247 also resets flip-flop 258 because of a logical one which appears on line 261. It will therefore be appreciated that flip-flops 247 and 258 comprise a means for providing a disabling pulse upon each occurence of an address change on address bus 221.

Since address counter 141 is being clocked by a signal of approximately 38.4 kHz and there are sixteen segments in each of the analog multiplexers such as multiplexer 138, each segment is activated for approximately 26 microseconds. The selection of the period of one shot 227 to be on the order of a few microseconds causes the disabling output from flip-flop 247, which appears at point 246, to be brief with respect to the period in which each segment is being updated. Note that the rising edge at point 219, which clocks flip-flop 247 to disable the analog multiplexers, must pass through gate 220 and therefore the clock signal to counter 141 will be delayed by the propagation delay through gate 220. This delay is sufficient to assure that the multiplexers will be disabled by the time counter 141 responds to the rising edge at its clock input and begins changing the address on bus 221. It will be apparent to those skilled in the art that if the particular gate 220 does not have sufficient propagation delay, buffers may be added between this gate and the clock input of counter 141 to assure the disabling of the multiplexers prior to changes on address bus 221.

From the foregoing description of the preferred embodiment it will be appreciated that the present arrangement provides a novel and inexpensive multiplexed liquid crystal display arrangement. It is to be understood that the scope of the present invention is only to be limited by the claims below.

We claim:
1. An improved multiplexed display comprising
   a liquid crystal display device including a plurality of segments and a back plane;
   a capacitor connected to each of said segments for temporarily storing a data bit;
   each of said segments being connected to one of a plurality of output terminals of a multiplexer;
   said multiplexer including a multiplexer input and addressing means driven by a clock signal characterized by two states from a clock for successively connecting said multiplexer input to said output terminals;
   means for connecting said clock signal to said back plane;
   data means for providing data bits, one at a time,
   said data bits corresponding to a visible output from said liquid crystal display device; and
   switching means connecting said data means and said multiplexer input for providing said data bits to said multiplexer input when said clock signal is in a first state of said two states and alternately for providing the complement of said data bits to said multiplexer input when said clock signal is in a second state of said two states.
2. The display of claim 1 wherein said multiplexer is an analog multiplexer including an enable input further comprising;
   pulsing means for providing a disabling pulse to said enable input upon each occurrence of a change of address at said addressing means.

* * * * *